United States Patent
Smith

(10) Patent No.: US 7,000,844 B1
(45) Date of Patent: Feb. 21, 2006

(54) DETACHABLE PROTECTED POINT OF SALE CARD

(75) Inventor: Dennis R. Smith, Minnetonka, MN (US)

(73) Assignee: UV Color, Inc., Roseville, MN (US)

( * ) Notice: Subject to any disclaimer, the term of this patent is extended or adjusted under 35 U.S.C. 154(b) by 51 days.

(21) Appl. No.: 10/384,163

(22) Filed: Mar. 7, 2003

(51) Int. Cl.
G06K 19/00 (2006.01)

(52) U.S. Cl. ..................... 235/487; 235/492

(58) Field of Classification Search ............. 235/487, 235/380, 379, 382, 383, 493, 449, 492; 283/51, 283/61, 56
See application file for complete search history.

(56) References Cited

U.S. PATENT DOCUMENTS

| | | |
|---|---|---|
| 449,973 A | 4/1891 | Smith |
| 1,381,609 A | 6/1921 | Woronzoff |
| 1,384,457 A | 7/1921 | Fetters |
| 1,729,916 A | 10/1929 | Veron |
| 2,279,164 A | 4/1942 | Gettleman |
| 2,284,586 A | 5/1942 | McDermott |
| 2,616,612 A | 11/1952 | Guttman |
| 3,069,793 A | 12/1962 | Francescon |
| 3,159,329 A | 12/1964 | Hiersteiner |
| 3,164,317 A | 1/1965 | Bogen |
| 3,461,581 A | 8/1969 | Hoffmann |
| 3,684,869 A | 8/1972 | Relter |
| 3,697,101 A | 10/1972 | Loos et al. |
| 3,716,439 A | 2/1973 | Maeda |
| 3,734,396 A | 5/1973 | Cowan |
| 3,895,220 A | 7/1975 | Nelson et al. |
| 4,051,996 A | 10/1977 | Ross et al. |
| 4,204,639 A | 5/1980 | Barber et al. |
| 4,520,958 A | 6/1985 | Jones et al. |
| 4,531,993 A | 7/1985 | Bradley |
| 4,589,687 A | 5/1986 | Hannon |
| 4,602,447 A | 7/1986 | Feingold |
| 4,602,737 A | 7/1986 | Lorenz |
| 4,606,555 A | 8/1986 | Adams |
| 4,617,215 A | 10/1986 | Telesco |
| 4,636,179 A | 1/1987 | Gentile et al. |
| 4,687,231 A | 8/1987 | Hartmann |
| 4,791,281 A | 12/1988 | Johnsen et al. |
| 4,795,196 A | 1/1989 | Hyun et al. |
| 4,815,768 A * | 3/1989 | Applebaum et al. .......... 283/67 |
| 4,828,104 A | 5/1989 | Ribellino, Jr. |
| 4,957,311 A | 9/1990 | Geisenheimer |
| 4,978,146 A | 12/1990 | Warther et al. |
| 4,986,868 A | 1/1991 | Schmidt |
| 5,131,686 A | 7/1992 | Carlson |
| 5,173,080 A | 12/1992 | Longtin |
| 5,209,514 A | 5/1993 | Hebert |
| 5,219,183 A | 6/1993 | McKillip |
| 5,281,799 A | 1/1994 | McIntire et al. |
| 5,403,236 A | 4/1995 | Greig |
| 5,413,532 A | 5/1995 | Raby |
| 5,427,832 A | 6/1995 | Longtin |
| 5,494,544 A | 2/1996 | Hill et al. |

(Continued)

Primary Examiner—Michael G. Lee
Assistant Examiner—Kimberly D. Nguyen
(74) Attorney, Agent, or Firm—Fredrikson & Byron, P.A.

(57) ABSTRACT

The invention is generally directed toward display and presentment technology for activatable point of sale cards. The cards can be mounted on a display sheet for use in display or shipment applications. In addition security benefits are provided by orienting a data field on the card such that removal of the card from the sheet is required for card activation.

16 Claims, 2 Drawing Sheets

U.S. PATENT DOCUMENTS

| | | | |
|---|---|---|---|
| 5,495,981 A * | 3/1996 | Warther | 229/71 |
| 5,534,320 A | 7/1996 | Raby | |
| 5,612,526 A * | 3/1997 | Oguchi et al. | 235/375 |
| 5,632,511 A | 5/1997 | Longtin et al. | |
| 5,640,447 A | 6/1997 | Fonseca | |
| 5,650,209 A | 7/1997 | Ramsburg et al. | |
| 5,662,976 A | 9/1997 | Popat et al. | |
| 5,667,247 A | 9/1997 | Ramsburg et al. | |
| 5,673,309 A | 9/1997 | Woynoski et al. | |
| 5,695,589 A | 12/1997 | German et al. | |
| 5,720,158 A * | 2/1998 | Goade, Sr. | 53/460 |
| 5,769,457 A * | 6/1998 | Warther | 283/61 |
| 5,842,722 A | 12/1998 | Carlson | |
| 5,883,377 A * | 3/1999 | Chapin, Jr. | 235/493 |
| 5,895,074 A | 4/1999 | Chess et al. | |
| 5,958,174 A | 9/1999 | Ramsberg et al. | |
| 6,039,356 A * | 3/2000 | Warther et al. | 283/61 |
| 6,109,439 A * | 8/2000 | Goade, Sr. | 206/454 |
| 6,173,901 B1 * | 1/2001 | McCannel | 235/493 |
| 6,315,206 B1 * | 11/2001 | Hansen et al. | 235/487 |
| 6,328,341 B1 * | 12/2001 | Klure | 283/62 |
| 6,520,542 B1 * | 2/2003 | Thompson et al. | 283/51 |
| 6,543,809 B1 * | 4/2003 | Kistner et al. | 283/57 |
| 6,581,827 B1 * | 6/2003 | Welton | 235/380 |
| 6,588,658 B1 * | 7/2003 | Blank | 235/380 |
| 6,688,529 B1 * | 2/2004 | Goade, Sr. | 235/488 |
| 2003/0150919 A1 * | 8/2003 | Blank | 235/487 |

\* cited by examiner

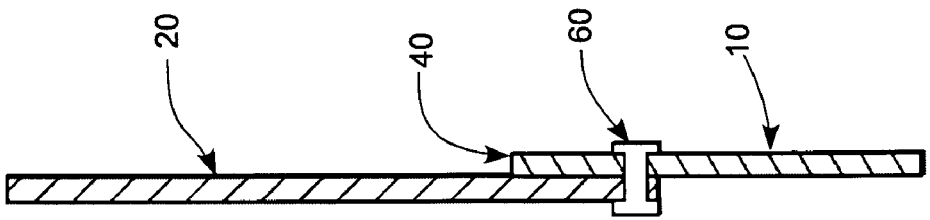
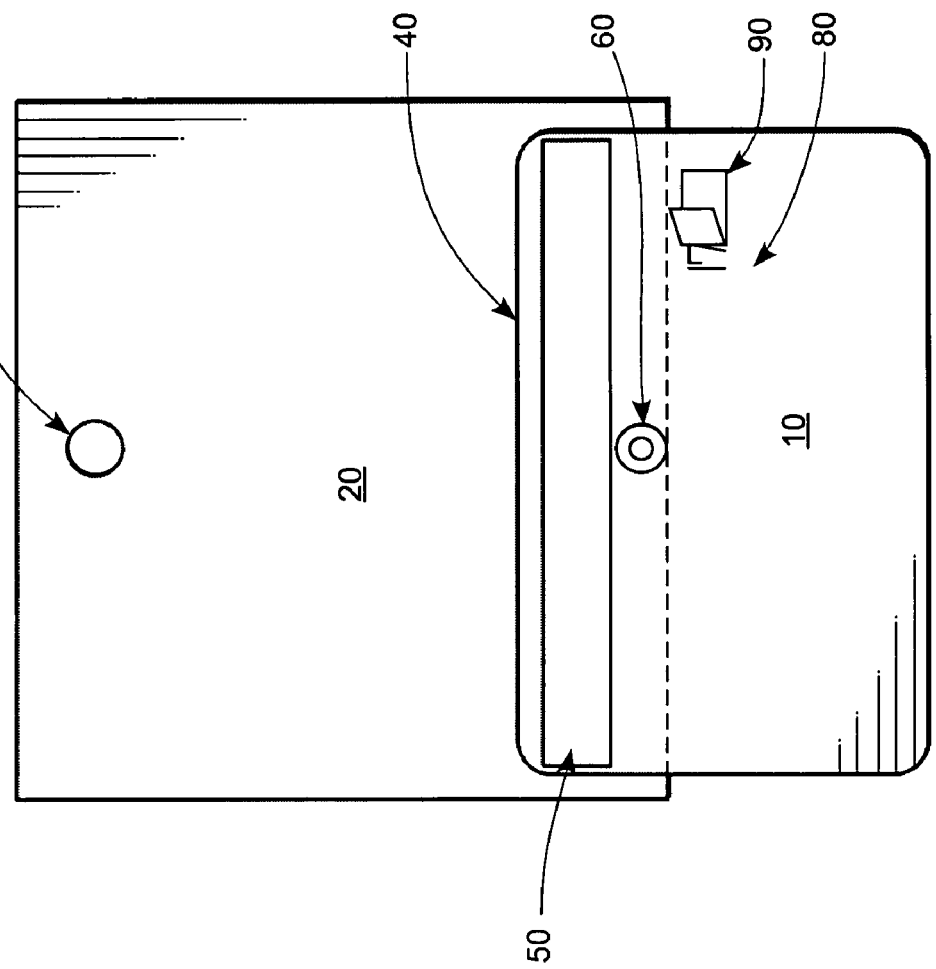

US 7,000,844 B1

DETACHABLE PROTECTED POINT OF SALE CARD

FIELD OF THE INVENTION

The invention relates generally to display technology related to activatable point of sale cards.

BACKGROUND OF THE INVENTION

Within the last thirty years there has been a revolution in use of plastic, or plastic-like credit cards, debit cards and gift cards. In more recent years further developments have led to the use of such phone and credit card technologies in the field of products that are activated at the point of sale. These products are distributed to retailers in bulk and are activated by the retailers or another party upon purchase by the end user.

Before the advent of point of sale activation, such debit and gift cards were typically kept under lock and key because in their activated form they were valuable and easy to steal. With point of sale activation, the cards are now displayed freely since they are essentially valueless until activated. This has led suppliers of the cards to desire attractive packages that are easy to display, inexpensive to ship in bulk, and capable of indicating unauthorized activation.

Numerous attempts to provide point of sale products for metered accounts have overlooked a simple solution involving a combination of ease of manufacture, excellent point of sale surface configuration for advertising, ease of separation of a card from an attached sheet, and protection against theft.

SUMMARY OF THE INVENTION

According to a first aspect of the invention, a protectable point of sale card is manufactured using a single sheet of material with a score line separating the card from a connected display sheet. Removing the card from the sheet merely requires bending and breaking or tearing the sheet along the score line to free the card. There is a data field on the card that is oriented parallel to the score line and no more than one inch form the score line.

A second aspect of the invention includes a display sheet and card manufactured from a single sheet of material. The card is separated from the display sheet by a score line along a single edge of the card. A data field is applied to the card parallel to the score line and closer to the edge of the card defined by the score line than the opposite edge.

A third aspect of the invention includes a card with a data field which is attached to a separate display sheet so that the data field is made inaccessible to standard data reading machines while the card is attached to the display sheet.

The sheet and card are suitable for marketing and promotional materials to be placed on their surface area, for hanging at a point of sale rack as appropriate, and for blocking activation of the card at a point of sale location unless the card has been previously purchased and separated from the display sheet.

The invention is also directed at a method of activating the card by removing it from the display sheet, passing the card through a data reading device, and transmitting the data to an activating apparatus.

BRIEF DESCRIPTION OF THE DRAWINGS

FIG. 3 is a plan view of one side of an embodiment of the point of sale card system.

FIG. 4 is a side view of an embodiment of the point of sale card system.

DETAILED DESCRIPTION OF PREFERRED EMBODIMENTS

Figure 1:
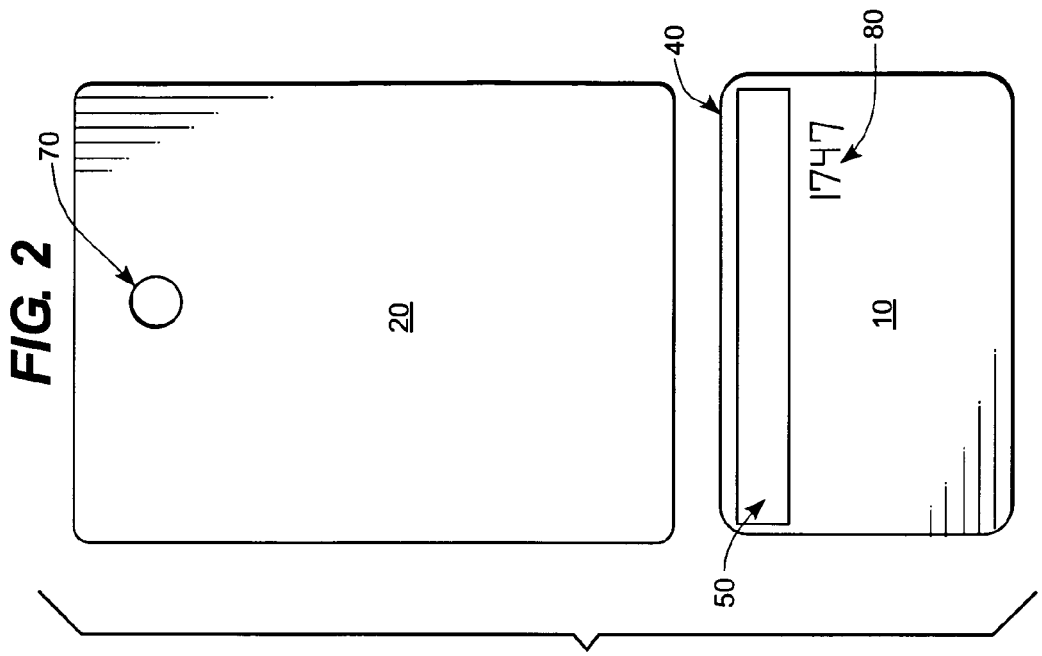
FIG. 1 is a plan view of one side of an embodiment of the point of sale card system prior to activation.

Referring to the drawings, FIG. 1 shows a card 10 and a card display sheet 20 attached at a score line 30. The score line is a notch or incision which may or may not pass through the object. Examples of score lines include perforation common in many paper products and "scratches" in tile which allow for breaking along the score line even though the "scratch" does not pass through the tile. In a preferred embodiment of the present invention the display sheet 20 and the card 10 are manufactured from a single sheet of material. The display sheet 20 can be any size relative to the card 10 and the card and display sheet may be oriented in a coplanar relationship.

Figure 2:
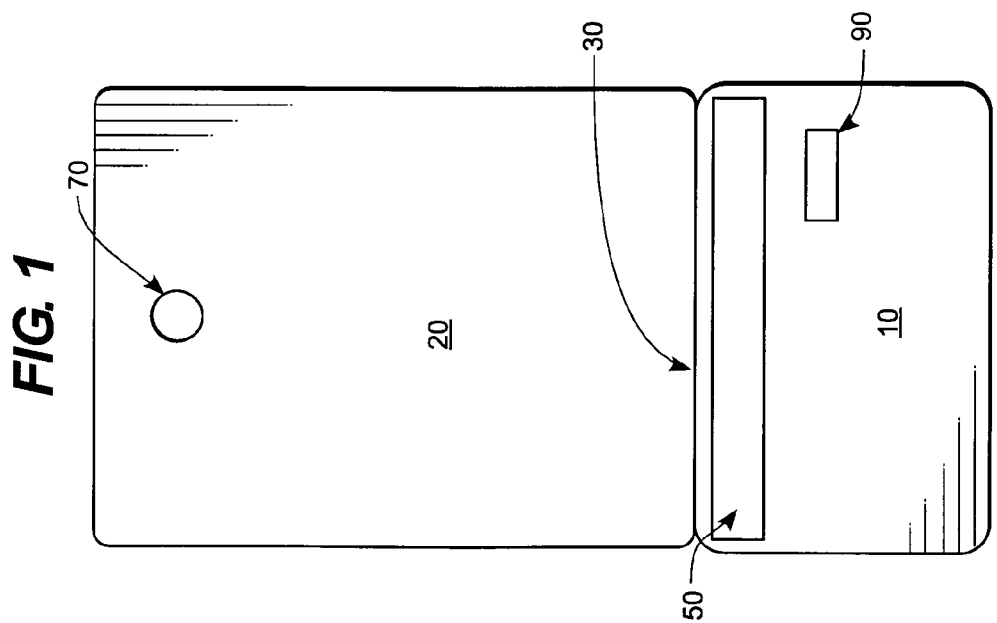
FIG. 2 is a plan view of the embodiment of FIG. 1 shown with the card detached from the sheet and in a position to effect activation.

The card 10 is separated from the display sheet 20 by a score line 30 along a single side 40 of the card. In this manner the card can be easily removed from the display sheet, as shown in FIG. 2. The card 10 is not embedded in or surrounded by portions of the display sheet 20. Further, in embodiments where the sheet of material is a sturdy plastic constructed in this fashion, it is less likely that removal of the card will result in damage to the card as can happen when more than one side of the card is connected to the display sheet.

The card has a data field 50, which is a machine-readable collection of data well-known in the art. Examples include, but are not limited to, bar codes, magnetic strips, programmable chips, or machine readable optical characters. The data field 50 may be oriented parallel to the score line 30. In a preferred embodiment the data field 50 is positioned closer to the score line 30 than it is to the edge of the card opposite the score line 30. This unique arrangement requires the card to be removed from the display sheet prior to point of sale activation and provides several security benefits.

In the event that the data field 50 is a magnetic strip, for example, international standards promulgated by the International Organization for Standardization ("ISO") and the International Electrotechnical Commission ("IEC") standardize the location of the magnetic strip relative to an edge of the card. The strip must be within a specific distance from the edge of the card that will be placed against the reader, known as the reference edge, in order for standard machines to read or write onto the strip. In a preferred embodiment of the invention the reference edge is edge 40. Up to three "data tracks" may be used per standard magnetic strip. If all three data tracks are used, the distance from the reference edge 40 of the card 10 to the nearest edge of the magnetic strip is 0.218 inches and the distance to the edge of the magnetic strip farthest from the reference edge 40 is 0.628 inches according to ISO/IEC 7811-6:2001(E), adopted in February of 2001. In a preferred embodiment of the invention, the data field 50 is a magnetic strip oriented so that the reference edge 40 of the card 10 is the scored edge initially attached to the display sheet. In such an orientation the data field 50 cannot be read or written to by standard equipment until the card 10 is removed from the display sheet 20 as the data field 50 is too far from the exposed edge to be read from or written to by standard equipment.

In another embodiment, the invention includes a hole 70 through the display sheet to allow the display sheet and card to be suspended from retail display racks or other appropriate locations. The hole 70 can be of any size or shape appropriate to the application involved.

In one embodiment the card has a personal identification number ("PIN") 80 printed on it, which may be obscured by a removable covering 90. The removable covering may be in the form of a hot foil stamp or a sticker affixed with glue, for example. If the covering 90 is disturbed to view the PIN 80, it may be irreparably damaged so that the party responsible for activating the card is aware that the security of the PIN 80 has been compromised.

The sheet of material from which the card and display sheet are manufactured may be a single plastic or plastic-like component or a laminated composite of several components. The sheet and card may be capable of receiving printed matter for advertising and other purposes as is well known in the art. The printing may be done through any means known in the art.

One embodiment of the card may be manufactured from a sheet of styrene, polyvinyl chloride, or other material. This embodiment provides for easier manufacture of the invention and creates a more durable card. Durability is a very important attribute since the cards may be used for long periods of time and subjected to abuse and damaging environments.

Generic, not card-specific, data may be printed on this embodiment with ultraviolet ("UV") curable ink. UV curable inks may be applied directly to durable plastics such as styrene and polyvinyl chloride, among others, thus eliminating the need for protective layers of lamination. UV curable inks may be so applied because they cure quickly upon exposure to ultraviolet light. Conventional inks contain solvents that contain the pigmentation constituents. Conventional inks cure more slowly because the solvent containing the pigmentation must either evaporate into the atmosphere or be absorbed by the substrate material to which the ink is applied in order for the ink to cure.

The second side of the sheet of material of this embodiment may be printed in the same manner as the first side. The printing on the card 10 and/or the display sheet 20 may include an inkjet image of bar coding, other machine-readable bar images and/or human readable images unique to each card as well as other card-specific data. One or both sides may then be coated with a UV curable coating that protects the printed surface. The UV curable coating may include acrylates, photoinitaitors, and other polymers and monomers. This coating can add an attractive shiny or satin appearance to the product, prevent fading due to light exposure, and provide some resistance to scratches or abrasions. It is also not susceptible to delaminating.

This embodiment is then die cut to shape and the sheet is scored as necessary to create the various components of the invention. A magnetic strip is also applied in any one of the orientations described above. The magnetic strip may then be encoded with data unique to each card, and that data may correspond with the data of the bar coding, other machine readable images, and/or human readable images of the card-specific data.

The card may then be camera-verified with a system that is linked to a central database. This type of system is known in the art. The system will confirm one or more of the following; that there are no duplicate cards, that there are no cards missing, that all cards are in the correct order, and that the unique information on each card is consistent if more than one unique identifier is applied to each card (i.e., bar code and magnetic strip and human readable).

The card may also be manufactured separately from the display sheet and attached to the display sheet in a fashion that prevents the data field from being accessed for activation without removing the card from the display sheet. The card can be attached to the display sheet by glue or a fastener or any means known in the art. Referring now to FIG. 3, a display sheet 20 is attached to a card 10 by a fastener 60. The card 10 has a data field 50 located parallel to a reference edge 40. The fastener 60 is located such that card cannot be activated using normal means until it is removed from the display sheet 20 because the reference edge 40 and the data field 50 are inaccessible by standard data reading and writing machines. In one embodiment the data field 50 would be a bar code disposed on the card 10 and facing the display sheet 20. The fastener 60 would be located so that the display sheet 20 obscured the bar code until the card is removed from the display sheet.

As discussed above, card-specific data is encoded on the data field 50 during card production. In use, the retailer or card activating entity first removes the card from the card display sheet. The card is then activated by passing it through a data reading device or passing a data reading device over the card. Such data reading devices are well known in the art. The data reading device reads card-specific information from the data field and transmits that information to a computer. The computer monitors metered accounts, and credits an appropriate amount to a metered account, which can be accessed by the purchaser of the card. The retailer or card activating entity may also transmit transaction-specific information to the computer to enable the card to be credited with varying amounts of value depending on details of the purchase transaction.

While exemplary embodiments of this invention have been illustrated and described, it should be understood that various modifications, adaptations and changes might be made therein without departing from the spirit of the invention and the scope of the appended claims.

The invention claimed is:

1. An article comprising:
   a) a display sheet and a card manufactured from a single sheet of material, the card being generally rectangular and having a reference edge, a second edge opposite the reference edge, a third edge, and a fourth edge,
   b) wherein the card is separated from the display sheet by a score line along the reference edge and only the reference edge of the card and the second, third, and fourth edges of the card do not contact the display sheet; and
   c) a magnetic strip disposed on the card along the reference edge, wherein the magnetic strip is more than one inch from the second edge of the card and wherein the magnetic strip cannot be read with a conventional card reader without removing the card from the display sheet.

2. The article of claim 1, wherein the display sheet has a hole through the display sheet.

3. The article of claim 1, wherein the magnetic strip is oriented parallel to the score line.

4. The article of claim 1, wherein the sheet of material is non-laminated and wherein the display sheet has a hole through the display sheet.

5. The article of claim 1, wherein the magnetic strip comprises card-specific data which can be used to activate the card.

6. The article of claim 5, further comprising machine readable and/or human readable data printed on the card that corresponds to card-specific data on the magnetic strip.

7. The article of claim 5, further comprising machine readable and/or human readable data printed on the display sheet that corresponds to card-specific data on the magnetic strip.

8. An article comprising:
   a) a display sheet and a card manufactured from a single sheet of material the card being generally rectangular and having a reference edge, a second edge opposite the reference edge, a third edge, and a fourth edge,
   b) wherein the card is separated from the display sheet by a score line along the reference edge and only the reference edge of the card and the second, third, and fourth edges of the card do not contact the display sheet; and
   c) a magnetic strip disposed on the card along the reference edge, wherein the magnetic strip is closer to the reference edge than to the second edge of the card so that the magnetic strip cannot be read with a conventional card reader without removing the card from the display sheet.

9. The article of claim 8, wherein the display sheet has a hole through the display sheet.

10. The article of claim 8, wherein the magnetic strip is oriented parallel to the score line.

11. The article of claim 8, wherein the sheet of material is non-laminated and wherein the display sheet has a hole through the display sheet.

12. The article of claim 8, wherein the magnetic strip comprises card-specific data which can be used to activate the card.

13. The article of claim 12, further comprising machine readable and/or human readable data printed on the card that corresponds to card-specific data on the magnetic strip.

14. The article of claim 12, further comprising machine readable and/or human readable data printed on the display sheet that corresponds to card-specific data on the magnetic strip.

15. A process comprising the steps of:
   a) removing a card from a display sheet, wherein the display sheet and the card are manufactured from a single sheet of material, the card being generally rectangular and having a reference edge, a second edge opposite the reference edge, a third edge, and a fourth edge, and the card is separated from the display sheet by a single score line along the reference edge and only the reference edge of the card and the second, third, and fourth edges of the card do not contact the display sheet and wherein the card has a magnetic strip disposed on the card along the reference edge, where the magnetic strip is more than one inch from the second edge of the card so that the magnetic strip cannot be read with a conventional card reader without removing the card from the display sheet;
   b) activating the card by passing the card through a data reading device which reads card specific information from the magnetic strip; and
   c) transmitting the card-specific information to a computer which monitors metered accounts so that the computer can credit the account in the appropriate amount.

16. The process of claim 15, comprising the additional step of transmitting transaction-specific information to the computer.

\* \* \* \* \*